(12) United States Patent
Zheng et al.

(10) Patent No.: US 11,800,431 B2
(45) Date of Patent: Oct. 24, 2023

(54) ACCESS CONTROL METHOD, MESSAGE BROADCASTING METHOD, AND RELATED DEVICES

(71) Applicant: VIVO MOBILE COMMUNICATION CO., LTD., Chang'an Dongguan (CN)

(72) Inventors: Qian Zheng, Chang'an Dongguan (CN); Xiaodong Yang, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 109 days.

(21) Appl. No.: 17/094,195

(22) Filed: Nov. 10, 2020

(65) Prior Publication Data

US 2021/0058849 A1    Feb. 25, 2021

Related U.S. Application Data

(63) Continuation of application No. PCT/CN2019/086361, filed on May 10, 2019.

(30) Foreign Application Priority Data

May 11, 2018    (CN) .......................... 201810451425.2

(51) Int. Cl.
*H04W 48/02*    (2009.01)
*H04W 48/10*    (2009.01)
*H04W 84/04*    (2009.01)

(52) U.S. Cl.
CPC .......... *H04W 48/02* (2013.01); *H04W 48/10* (2013.01); *H04W 84/042* (2013.01)

(58) Field of Classification Search
CPC .............. H04W 48/00–20; H04W 84/042–047
See application file for complete search history.

(56) References Cited

U.S. PATENT DOCUMENTS

| 2014/0204838 A1 | 7/2014 | Kubota et al. |
| 2014/0329503 A1* | 11/2014 | Deng ............ H04W 48/02 |
| | | 455/411 |

(Continued)

FOREIGN PATENT DOCUMENTS

| CN | 102300285 A | 12/2011 |
| CN | 102761933 A | 10/2012 |

(Continued)

OTHER PUBLICATIONS

Patent Board Decision for U.S. Appl. No. 11/565,411, dated Jan. 3, 2014 (Year: 2014).*

(Continued)

*Primary Examiner* — Ronald Eisner
(74) *Attorney, Agent, or Firm* — von Briesen & Roper, s.c.

(57) ABSTRACT

Provided are an access control method, a message broadcast method, and a related device. The access control method comprises: determining access information of a terminal, the access information comprising at least one of an access category and public land mobile network (PLMN) information; receiving a first system message broadcast by a network side device, the first system message not carrying or carrying at least one set of access control parameters, each set of access control parameters of the at least one set of access control parameters being associated with at least one piece of access information; if the first system message is not carrying access control parameters, or the access information is not associated with the at least one set of access control parameters, executing a specific action.

7 Claims, 4 Drawing Sheets

(56) References Cited

U.S. PATENT DOCUMENTS

| | | | |
|---|---|---|---|
| 2014/0331249 A1 | 11/2014 | Cain et al. | |
| 2014/0376433 A1* | 12/2014 | Li | H04W 52/0225 370/329 |
| 2016/0345357 A1* | 11/2016 | Fan | H04W 76/14 |
| 2016/0205123 A1* | 12/2016 | Rico et al. | H04W 12/08 |
| 2016/0374109 A1* | 12/2016 | Rico Alvarino | H04W 72/1263 |
| 2017/0339608 A1* | 11/2017 | Cui | H04W 12/08 |

FOREIGN PATENT DOCUMENTS

| | | |
|---|---|---|
| CN | 103096425 A | 5/2013 |
| CN | 103945474 A | 7/2014 |
| CN | 107018555 A | 8/2017 |
| EP | 3101829 A1 | 12/2016 |
| EP | 3247144 A1 | 11/2017 |
| WO | 2014059820 A1 | 4/2014 |
| WO | 2017039565 1 | 3/2017 |

OTHER PUBLICATIONS

Merriam-Webster.com Thesaurus, Merriam-Webster, https://www.merriam-webster.com/thesaurus/mapped%20%28out%29 printed Aug. 1, 2023, the meaning of "Mapped (out)". (Year: 2023).*
Cambridge Dictionary, meaning of the term "when" printed on Jul. 18, 2023. (Year: 2023).*
International Search Report & Written Opinion related to Application No. PCT/CN2019/086361; dated Nov. 26, 2020.
Chinese Office Action for related Chinese Application No. 201810451425.2; dated Apr. 27, 2020.
Ericsson, "Reducing signaling overhead in access barring information", Apr. 16-20, 2018, 3GPP TSG RAN WG2 #101bis, Sanya, China.
Extended European Search Report for related Application No. 19799336.3; dated Jun. 16, 2021.
Japanese Reasons for Refusal Office Actions related to JP Application No. 2020-563617 dated Dec. 28, 2021.
R2-1804716, Source: Ericsson, "Clarifications on RRC procedure for unified access control" Document for: Discussion, Decision, Agenda Item: 10.4.1.8.5. 3GPP TSG-RAN WG2 #101bis, Sanya, China, Apr. 16-20, 2018.

* cited by examiner

ACCESS CONTROL METHOD, MESSAGE BROADCASTING METHOD, AND RELATED DEVICES

CROSS-REFERENCE TO RELATED APPLICATION

This patent application is a bypass continuation under 35 U.S.C. § 111 of PCT/CN2019/086361 filed on May 10, 2019, which claims priority to Chinese Patent Application No, 201810451425.2 filed in China on May 11, 2018, which is incorporated herein by reference in its entirety.

TECHNICAL FIELD

The present disclosure relates to the field of communications technologies, and in particular, to an access control method, a message broadcasting method, and related devices.

BACKGROUND

In a unified access control (UAC) solution, access categories are respectively defined for various service requests of a terminal, and in a system message broadcast by a network side device, different access information is associated with different access control parameters, where access information includes at least one of an access category and public land mobile network (PLMN) information. When the terminal has a service request, the terminal obtains a corresponding access control parameter in the system message based on access information of the service request, and determine, based on the access control parameter, whether an access request is barred or not, to determine whether to initiate the access request for the service request.

If each piece of access information is configured with an associated access control parameter when the network side device broadcasts the system message, signaling overheads of the network side device may be relatively high. However, there are many different access categories in UAC. Therefore, generally, in the system message, only some access information is configured with associated access control parameters. Particularly, for undefined access categories, associated access control parameters are not configured in the system message.

However, in the related technologies, an operation of the terminal when the access information of the service request initiated by the terminal is not configured with the associated access control parameter is defined. In this case, the operation of the terminal may be uncontrollable, thereby causing poorer service experience of the terminal.

SUMMARY

According to a first aspect, an embodiment of the present disclosure provides an access control method applied to a terminal, including:
 determining access information of the terminal, where the access information includes at least one of an access category and public land mobile network PLMN information;
 receiving a first system message broadcast by a network side device, where the first system message does not carry an access control parameter or carries at least one access control parameter, and each of the at least one access control parameter is associated with at least one piece of access information; and
 performing a specific operation if the first system message does not carry the access control parameter or the access information is not associated with the at least one access control parameter.

According to a second aspect, an embodiment of the present disclosure further provides a message broadcasting method applied to a network side device, including:
 broadcasting a first system message, where the first system message does not carry an access control parameter or carries at least one access control parameter, and carries a common access control parameter; or
 broadcasting a first system message and a second system message, where the first system message does not carry an access control parameter or carries at least one access control parameter, and the second system message carries a common access control parameter; or
 broadcasting a second system message, where the second system message carries a common access control parameter, where
 each of the at least one access control parameter is associated with at least one piece of access information; and the common access control parameter is not associated with the access information.

According to a third aspect, an embodiment of the present disclosure further provides a terminal, including:
 a determining module, configured to determine access information of the terminal, where the access information includes at least one of an access category and public land mobile network PLMN information;
 a receiving module, configured to receive a first system message broadcast by a network side device, where the first system message does not carry an access control parameter or carries at least one access control parameter, and each of the at least one access control parameter is associated with at least one piece of access information; and
 a processing module, configured to perform a specific operation if the first system message does not carry the access control parameter or the access information is not associated with the at least one access control parameter.

According to a fourth aspect, an embodiment of the present disclosure further provides network side device, including:
 a sending module, configured to:
 broadcast a first system message, where the first system message does not carry an access control parameter or carries at least one access control parameter, and carries a common access control parameter; or
 broadcast a first system message and a second system message, where the first system message does not carry an access control parameter or carries at least one access control parameter, and the second system message carries a common access control parameter; or
 broadcast a second system message, where the second system message carries a common access control parameter, where
 each of the at least one access control parameter is associated with at least one piece of access information; and the common access control parameter is not associated with the access information.

According to a fifth aspect, an embodiment of the present disclosure further provides a terminal, including a memory, a processor, and a program stored in the memory and executable on the processor, where the program, when executed by the processor, implements the steps in the foregoing access control method.

According to a sixth aspect, an embodiment of the present disclosure further provides a computer readable storage medium, where the computer readable storage medium stores a program, and the program, when executed by the processor, implements the steps in the foregoing access control method.

According to a seventh aspect, an embodiment of the present disclosure further provides a network side device, including: a memory, a processor, and a program stored in the memory and executable on the processor, where the program, when executed by the processor, implements the step in the foregoing message broadcasting method.

According to an eighth aspect, an embodiment of the present disclosure further provides a computer readable storage medium, where the computer readable storage medium stores a program, and the program, when executed by the processor, implements the step in the foregoing message broadcasting method.

BRIEF DESCRIPTION OF THE DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
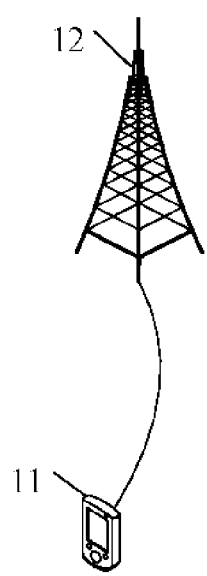
FIG. 1 is a structural diagram of a network system according to an embodiment of the present disclosure.

Referring to FIG. 1, FIG. 1 is a schematic structural diagram of a network to which an embodiment of the present disclosure can be applied. As shown in FIG. 1, the network includes a terminal (User Equipment, UE) 11 and a network side device 12, where the terminal 11 may be a terminal side device such as a mobile phone, a tablet computer, a laptop computer, a personal digital assistant (PDA), a mobile Internet device (MID), or a wearable device. It should be noted that a specific type of the terminal 11 is not limited in this embodiment of the present disclosure. The foregoing network side device 12 may be a macro station, an LTE eNB, a 5G NR NB, or the like. Alternatively, the network side device 12 may be a small station, such as a low power node (LPN) pico base station or a femto cell, or may be an access point (AP). The base station may be a network node jointly constituted by a central unit (CU) and a plurality of transmission reception points (TRP) that are managed and controlled by the central unit. It should be noted that a specific type of the network side device 12 is not limited in this embodiment of the present disclosure.

An embodiment of the present disclosure provides an access control method applied to a terminal, including:

determining access information of the terminal, where the access information includes at least one of an access category and public land mobile network PLMN information;

receiving a first system message broadcast by a network side device, where the first system message does not carry an access control parameter or carries at least one access control parameter, and each of the at least one access control parameter is associated with at least one piece of access information; and performing a specific operation if the first system message does not carry the access control parameter or the access information is not associated with the at least one access control parameter.

In this embodiment of the present disclosure, when access information of a service request initiated by the terminal is not configured with an associated access control parameter, the terminal can perform the specific operation, thereby reducing a possibility that the operation of the terminal is uncontrollable, and improving service experience performance of the terminal.

Figure 2:
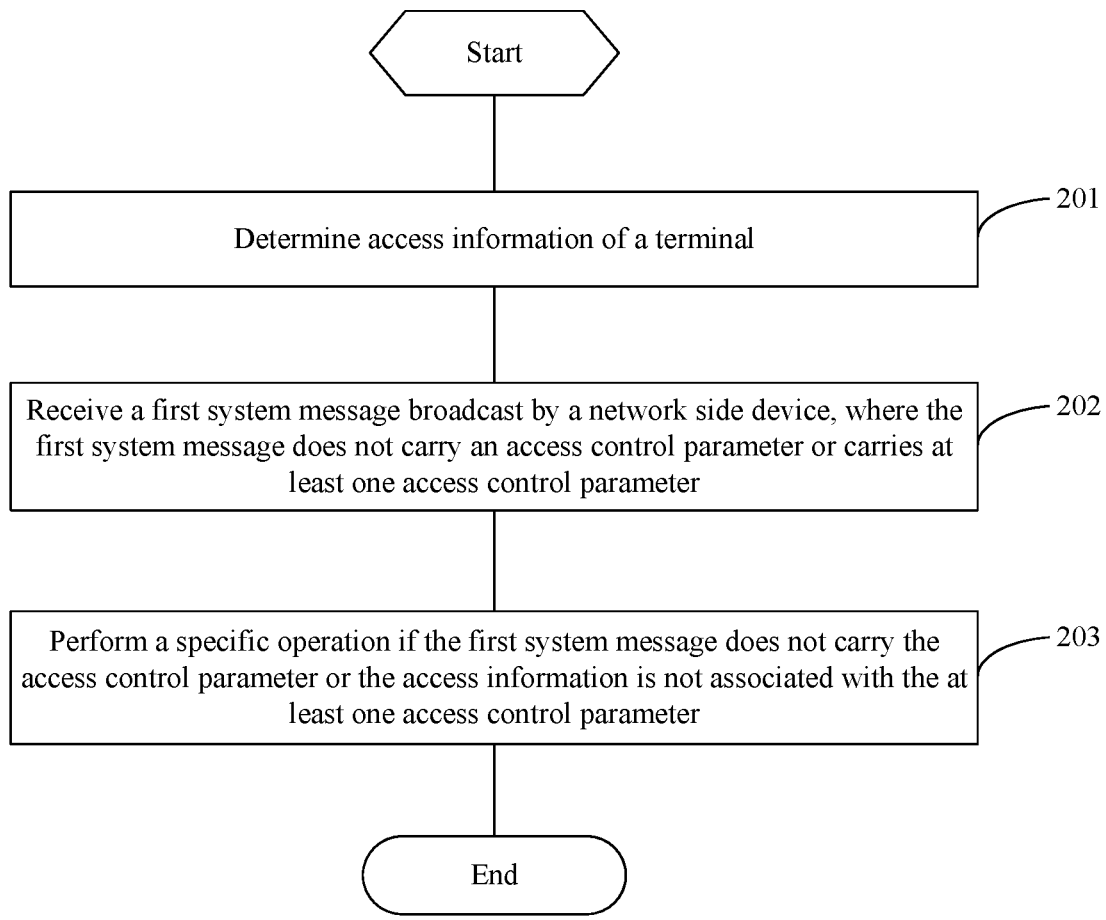
FIG. 2 is a flowchart of an access control method according to an embodiment of the present disclosure.

Referring to FIG. 2, FIG. 2 is a flowchart of an access control method according to an embodiment of the present disclosure. The access control method is applied to a terminal. As shown in FIG. 2, the access control method includes the following steps: 201 to 203.

Step 201: Determine access information of the terminal.

In this embodiment of the present disclosure, when the terminal initiates a service request, because access information is defined for each service request in a unified access control (UAC) solution, the terminal can determine, based on the defined access information in the UAC, access information of the service request initiated by the terminal. The access information includes at least one of an access category and public land mobile network (PLMN) information.

For example, there are currently 64 different access categories (access categories 0 to 63) in total in the UAC, and in the NR communication standard, at least one of the foregoing 64 different access categories can be defined for each service request of the terminal. For example, the access category defined for a response to paging request is 0, the access category defined for an emergency request is 2, the access category defined for a mobile originate (MO) multi media telephony (MMTel) voice call request is 4, and the access category defined for a mobile originate multi media telephony video call request (MO MMTel video call) is 5. If a service request of the terminal is an emergency request, the terminal can determine that an access category of the service request is 2.

In addition, the foregoing access information may also include the PLMN information, and some services of the terminal are allowed to initiate access requests of service requests of the services on a specific PLMN. For example, a delay tolerant service is defined as allowing initiation of an access request on part of PLMN carried in a broadcast message, and an access category defined for the access request for the service is 1; and an operator customized service is also defined as allowing initiation of an access request at access categories defined for an operator to which a PLMN determined by the terminal belongs, and the access categories defined for the access request for the service are 32 to 63.

Step 202: Receive a first system message broadcast by a network side device, where the first system message does not carry an access control parameter or carries at least one access control parameter, and each of the at least one access control parameter is associated with at least one piece of access information.

In this embodiment of the present disclosure, each network side device can broadcast a system message, that is, the first system message, on its network, where the first system message may not carry any access control parameter or may carry at least one access control parameter, and each of the at least one access control parameter is associated with at least one piece of access information. When the terminal initiates a service request, the terminal can receive a system message broadcast by a network side device of a network at which the terminal is located.

The foregoing each of the at least one access control parameter is used to indicate whether an access request for its associated access information is barred or not, so that the terminal can determine whether to initiate a corresponding access request based on an access control parameter associated with access information of the terminal.

However, if the network side device pre-configures an access control parameter for each piece of access information, maximum signaling overheads that need to be supported are relatively high, and a broadcast channel capacity of a network is very limited, so that the network side device cannot broadcast configured access control parameters associated with all access information. Particularly, in the communication standard, the network side device has not yet defined some access categories (for example, the current undefined access categories in the communication standard are 8 to 31), that is, this part of access categories is not configured with associated access control parameters.

It can be learned that when the terminal initiates the service request, the access information of the terminal may not be configured with an associated access control parameter. In other words, the first system message broadcast by the network side device of the network at which the terminal is located does not carry an access control parameter associated with the access information of the terminal, and even the access information of the terminal is not configured with an associated access control parameter.

It should be noted that the foregoing Step 202 may occur before or after Step 201, or occur simultaneously with Step 201. FIG. 2 only shows a case in which Step 202 occurs after Step 201, which is not limited herein.

Step 203: Perform a specific operation if the first system message does not carry the access control parameter or the access information is not associated with the at least one access control parameter.

In this embodiment of the present disclosure, after the terminal receives the first system message in the foregoing Step 202, the terminal reads the first system message and determines whether an access control parameter associated with the access information of the terminal is configured in the first system message. When the access information of the terminal is not configured with an associated access control parameter, the terminal will perform a specific operation, thereby reducing a possibility that the operation of the terminal is uncontrollable, and improving service experience performance of the terminal.

The foregoing performing a specific operation by the terminal may be, for example, performing a specific operation by the terminal according to a preset rule, performing a specific operation by the terminal according to pre-configuration, or even defining and performing a specific operation by the terminal according to a protocol.

In a specific embodiment of the present disclosure, for the foregoing performing a specific operation by the terminal, a plurality of manners are provided to define the operation of the terminal, which include but are not limited to the following Manner 1 to Manner 8.

In Manner 1, the terminal is always allowed, according to a first preset rule, to initiate an access request for access information of the terminal.

In this case, once the terminal determines that in a first system message, a service request initiated by the terminal is not configured with an associated access control parameter, the terminal will not determine, based on the access control parameter, whether the access request of the terminal is barred or not, but directly allow the terminal to initiate the access request for the service request.

The foregoing first preset rule is a rule used to instruct the terminal to always allow initiation of the access request for the access information of the terminal when the terminal determines that in the first system message, the service request initiated by the terminal is not configured with the associated access control parameter.

In Manner 2, the terminal is always barred, according to a second preset rule, to initiate an access request for access information of the terminal.

In this case, once the terminal determines that in a first system message, a service request initiated by the terminal is not configured with an associated access control parameter, the terminal will not determine, based on the access control parameter, whether the access request of the terminal is barred or not, but directly bar the terminal to initiate the access request for the service request.

The foregoing second preset rule is a rule used to instruct the terminal to always bar initiation of the access request for the access information of the terminal when the terminal determines that in the first system message, the service request initiated by the terminal is not configured with the associated access control parameter.

In Manner 1, the terminal is always allowed to initiate the access request for the access information of the terminal, actually the access request for the access information of the terminal may be barred, but the terminal initiates the access request for the access information of the terminal, which may enable the terminal to occupy a network resource. However, in Manner 2, the terminal is always barred to initiate the access request for the access information of the terminal, which can not only define the operation of the terminal, but also prevent the terminal from occupying a network resource.

In Manner 3, the terminal applies, according to a third preset rule, an access control parameter agreed by a protocol to determine whether an access request for access information of the terminal is barred or not.

In this case, in the communications system, at least one access control parameter can be agreed by the protocol. When the terminal determines that in a first system message, a service request initiated by the terminal is not configured with an associated access control parameter, the terminal may apply, based on the at least one access control parameter agreed by the protocol, an access control parameter to determine whether an access request of the service request initiated by the terminal is barred or not, to define the operation of the terminal.

That the terminal applies, based on the at least one access control parameter agreed by the protocol, an access control parameter to determine whether an access request of the service request initiated by the terminal is barred or not may be as follows: The terminal randomly selects an access control parameter agreed by the protocol. This is not limited herein.

In addition, the foregoing third preset rule is a rule used to instruct the terminal to apply, when the terminal determines that in the first system message, the access information of the service request initiated by the terminal is not configured with the associated access control parameter, the access control parameter agreed by the protocol to determine whether the access request for the access information of the terminal is barred or not. It should be noted that the foregoing first preset rule, second preset rule and third preset rule may be rules pre-configured or pre-defined in the terminal or pre-defined for the terminal by a network side device according to a protocol.

Certainly, after the terminal applies the access control parameter to determine whether the access request of the service request initiated by the terminal is barred or not, the terminal can determine, based on a determined result, whether to initiate the access request or not. In other words, if the terminal determines that the access request of the terminal is barred, the terminal bars initiation of the access request; and if the terminal determines that the access request of the terminal is not barred, the terminal initiates the access request.

It can be learned from the foregoing Manner 1 to Manner 3 that the terminal performs the specific operation according to a preset rule, where the preset rule is used to instruct the terminal to allow initiation of an access request for the access information; or instruct the terminal to bar initiation of an access request for the access information; or instruct the terminal to apply an access control parameter agreed by a protocol to determine whether an access request for the access information is barred or not.

Certainly, in addition to performing, by the terminal, the specific operation based on the access control parameter agreed by the protocol, the terminal may also perform the specific operation based on another access control parameter. In a specific embodiment of the present disclosure, the performing the specific operation may include:

determining, based on a first access control parameter, whether an access request for the access information is barred or not, where the first access control parameter is not associated with the access information; or determining, based on a second access control parameter, whether an access request for the access information is barred or not, where the second access control parameter is associated with the access information.

For that the terminal determines, based on a first access control parameter, whether an access request for the access information is barred or not, a plurality of implementations are provided herein, specifically as follows:

In Manner 4, when at least one access control parameter carried in the foregoing first system message is associated with the access information, the terminal may apply, based on pre-configuration, one of the at least one access control parameter to determine whether the access request for the access information is barred or not, where the pre-configuration is used to instruct the terminal to apply an access control parameter, configured with associated access information, in the first system message to determine whether the access request for the access information is barred or not.

The foregoing applying an access control parameter, configured with associated access information, in the first system message to determine whether the access request for the access information is barred or not is as follows: The terminal determines, based on the access control parameter, whether the access request for the access information associated with the access control parameter is barred or not. If the access request for the access information associated with the access control parameter is barred, the access request for the access information of the service request initiated by the terminal is barred; and if the access request for the access information associated with the access control parameter is not barred, the access request for the access information of the service request initiated by the terminal is not barred.

In addition, the foregoing access control parameter applied by the terminal may be a randomly selected or designated access control parameter in at least one access control parameter configured with associated access information and carried in the first system message, for example, may be a first access control parameter or a last access control parameter in the at least one access control parameter configured with the associated access information and carried in the first system message.

Certainly, in addition to the foregoing Manner 4, the terminal can also apply a common access control parameter not associated with any access information to determine whether the access request for the access information is barred or not. In other words, in a specific embodiment of the present disclosure, the first access control parameter may be one of the at least one access control parameter; or a common access control parameter, where the common access control parameter is not associated with the access information.

Herein, that the terminal applies a common access control parameter to determine whether the access request for the access information is barred or not is as follows: The terminal determines, based on the common access control parameter, whether the access request is barred or not. If the access request is barred, it is determined that the access request for the access information of the terminal is barred; and if the access request is not barred, it is determined that the access request for the access information of the terminal is not barred.

Herein, for that the terminal applies a common access control parameter to determine whether the access request for the access information is barred or not, a plurality of implementations are provided, including but not limited to the following Manner 5 to Manner 7:

In Manner 5, the terminal applies a common access control parameter pre-configured in the terminal to determine whether the access request for the access information is barred or not.

In this case, the foregoing common access control parameter is pre-configured in the terminal. When the terminal determines that in the first system message, the service request initiated by the terminal is not configured with the associated access control parameter, the terminal can directly invoke the common access control parameter pre-configured in the terminal.

Certainly, the foregoing common access control parameter may alternatively be carried in a system message broadcast by a network side device, specifically as follows:

In Manner 6, the terminal reads the common access control parameter carried in the foregoing first system message to determine whether the access request for the access information is barred or not.

In this case, the first system message sent by the network side device also carries at least the foregoing common access control parameter. When the terminal determines that in the first system message, the service request initiated by the terminal is not configured with the associated access control parameter, the terminal can read the common access control parameter in the first system message.

In Manner 7, the terminal receives a second system message and reads a common access control parameter carried in the second system message, to determine whether the access request for the access information is barred or not.

In this case, the terminal can also receive the second system message. The second system message is a system message different from the foregoing first system message, and the second system message carries at least the foregoing common access control parameter.

It should be noted that the foregoing first system message and second system message may be broadcast by the same network side device, that is, the network side device broadcasts the first system message and the second system message in its network. Alternatively, the foregoing first system message and second system message may be sent by different network side devices. For example, in a multi-connection communications system, a terminal may be connected to a plurality of network side devices, and the foregoing first system message and second system message are respectively broadcast by two different network side devices connected to the terminal.

It can be learned from the foregoing Manner 5 to Manner 7 that in a specific embodiment of the present disclosure, the common access control parameter may be an access control parameter pre-configured in the terminal; or an access control parameter carried in the first system message; or an access control parameter carried in the second system message received by the terminal, where the second system message is different from the first system message.

In the foregoing Manner 4 to Manner 7, the terminal may determine, based on the first access control parameter not associated with the access information of the terminal, whether the access request for the access information is barred or not, and certainly, the terminal may also determine, based on the second access control parameter associated with the access information of the terminal, whether the access request for the access information is barred or not, which are specifically as follows.

In Manner 8, the terminal determines, based on the pre-configured access control parameter associated with the access information of the terminal, whether the access request for the access information is barred or not.

In this case, an access control parameter associated with the access information of the terminal is pre-configured in the terminal or pre-defined in the protocol. When the terminal determines that in the first system message, the service request initiated by the terminal is not configured with the associated access control parameter, the terminal can directly determine the access control parameter associated with the access information of the terminal.

It can be learned that in a specific embodiment of the present disclosure, the second access control parameter may be an access control parameter pre-configured in the terminal and associated with the access information.

It should be noted that after the foregoing Step 202, if the terminal determines that in the first system message, the service request initiated by the terminal is configured with the associated access control parameter, the terminal may determine, based on the access control parameter associated with the access information of the terminal, whether the access request for the access information of the terminal is barred or not. Details are not described herein again.

In this embodiment of the present disclosure, the foregoing access information may be at least one of an access category and PLMN information. Herein, that the access information is the access category is used as an example to describe the foregoing access control method:

determining, by the terminal, an access category of a service request initiated by the terminal;

receiving, by the terminal, a first system message broadcast by a network side device, where the first system message does not carry an access control parameter or carries at least one access control parameter, and each of the at least one access control parameter is associated with at least one access category; and performing, by the terminal, a specific operation if the first system message does not carry the access control parameter or the access category is not associated with the at least one access control parameter.

The foregoing performing, by the terminal, a specific operation may include but is not limited to the following Manner 1 to Manner 8.

In Manner 1, the terminal is always allowed, according to a first preset rule, to initiate an access request for an access category of the terminal.

In Manner 2, the terminal is always barred, according to a second preset rule, to initiate an access request for an access category of the terminal.

In Manner 3, the terminal applies, according to a third preset rule, an access control parameter agreed by a protocol to determine whether an access request for an access category of the terminal is barred or not.

In Manner 4, when at least one access control parameter carried in the foregoing first system message is associated with the access information, the terminal may apply, based on pre-configuration, one of the at least one access control parameter to determine whether the access request for the access category is barred or not, where the pre-configuration is used to instruct the terminal to apply an access control parameter, configured with an associated access category, in the first system message to determine whether the access request for the access category is barred or not.

In Manner 5, the terminal applies a common access control parameter pre-configured in the terminal to determine whether the access request for the access category is barred or not.

In Manner 6, the terminal reads the common access control parameter carried in the foregoing first system message to determine whether the access request for the access category is barred or not.

In Manner 7, the terminal receives a second system message and reads a common access control parameter carried in the second system message, to determine whether the access request for the access category is barred or not.

In Manner 8, the terminal determines, based on the pre-configured access control parameter associated with the access category of the terminal, whether the access request for the access category is barred or not.

According to the access control method in this embodiment of the present disclosure, access information of the terminal is determined; a first system message broadcast by a network side device is received, where the first system message does not carry an access control parameter or carries at least one access control parameter, and each of the at least one access control parameter is associated with at least one piece of access information; and a specific operation is performed if the first system message does not carry the access control parameter or the access information is not associated with the at least one access control parameter. In this way, when access information of a service request initiated by the terminal is not configured with an associated access control parameter, the terminal can perform the specific operation, thereby reducing a possibility that the operation of the terminal is uncontrollable, and improving service experience performance of the terminal.

Figure 3:
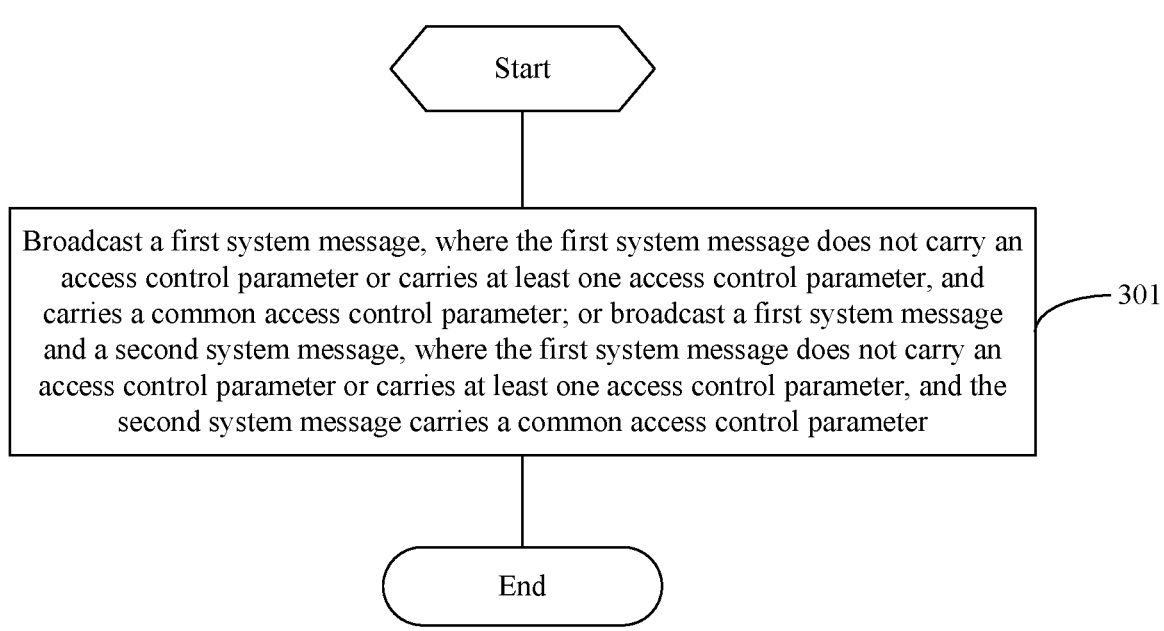
FIG. 3 is a flowchart of a message broadcasting method according to an embodiment of the present disclosure.

Referring to FIG. 3, FIG. 3 is a flowchart of a message broadcasting method according to an embodiment of the present disclosure. As shown in FIG. 3, the message broadcasting method includes the following steps:

Step 301: Broadcast a first system message, where the first system message does not carry an access control parameter or carries at least one access control parameter, and carries a common access control parameter; or broadcast a first system message and a second system message, where the first system message does not carry an access control parameter or carries at least one access control parameter, and the second system message carries a common access control parameter; or broadcast a second system message, where the second system message carries a common access control parameter.

Each of the at least one access control parameter is associated with at least one piece of access information; and the common access control parameter is not associated with the access information.

It should be noted that this embodiment of the present disclosure is used as an embodiment of a network side device corresponding to the embodiment shown in FIG. 2. For specific implementations of this embodiment, refer to related descriptions of the embodiment shown in FIG. 2. The same beneficial effects can be achieved. To avoid repetition, details are not described herein again.

Figure 4:
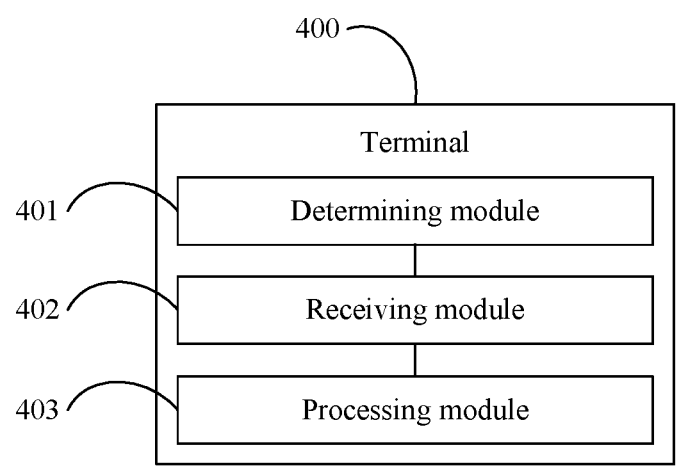
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes:

a determining module 401, configured to determine access information of the terminal, where the access information includes at least one of an access category and public land mobile network PLMN information;

a receiving module 402, configured to receive a first system message broadcast by a network side device, where the first system message does not carry an access control parameter or carries at least one access control parameter, and each of the at least one access control parameter is associated with at least one piece of access information; and a processing module 403, configured to perform a specific operation if the first system message does not carry the access control parameter or the access information is not associated with the at least one access control parameter.

Optionally, the processing module 403 is specifically configured to:

perform the specific operation according to a preset rule, where the preset rule is used to instruct the terminal to allow initiation of an access request for the access information; or instruct the terminal to bar initiation of an access request for the access information; or instruct the terminal to apply an access control parameter agreed by a protocol to determine whether an access request for the access information is barred or not.

Optionally, the processing module 403 is specifically configured to:

determine, based on a first access control parameter, whether an access request for the access information is barred or not, where the first access control parameter is not associated with the access information; or determine, based on a second access control parameter, whether an access request for the access information is barred or not, where the second access control parameter is associated with the access information.

Optionally, the first access control parameter is a control parameter specified in the at least one access control parameter; or a common access control parameter, where the common access control parameter is not associated with the access information.

Optionally, the common access control parameter is an access control parameter pre-configured in the terminal; or an access control parameter carried in the first system message; or an access control parameter carried in a second system message received by the terminal, where the second system message is different from the first system message.

Optionally, the second access control parameter is an access control parameter pre-configured in the terminal and associated with the access information.

It should be noted that the foregoing terminal 400 in this embodiment of the present disclosure may be a terminal of any implementation in the method embodiment, any implementation of the terminal in the method embodiment can be implemented by the foregoing terminal 400 in this embodiment of the present disclosure, and the same beneficial effects can be achieved. To avoid repetition, details are not described herein again.

Figure 5:
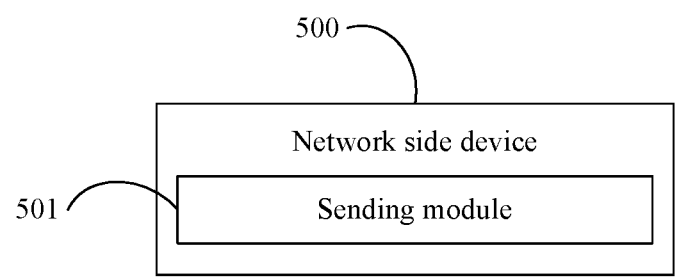
FIG. 5 is a structural diagram of a network side device according to an embodiment of the present disclosure.

Referring to FIG. 5, FIG. 5 is a structural diagram of a network side device according to an embodiment of the present disclosure. As shown in FIG. 5, the network side device 500 includes:

a sending module 501, configured to:

broadcast a first system message, where the first system message does not carry an access control parameter or carries at least one access control parameter, and carries a common access control parameter; or broadcast a first system message and a second system message, where the first system message does not carry an access control parameter or carries at least one access control parameter, and the second system message carries a common access control parameter; or broadcast a second system message, where the second system message carries a common access control parameter, where each of the at least one access control parameter is associated with at least one piece of access information; and the common access control parameter is not associated with the access information.

It should be noted that the foregoing network side device 500 in this embodiment of the present disclosure may be a network side device of any implementation in the method embodiment, any implementation of the network side device in the method embodiment can be implemented by the foregoing network side device 500 in this embodiment of the present disclosure, and the same beneficial effects can be achieved. To avoid repetition, details are not described herein again.

Figure 6:
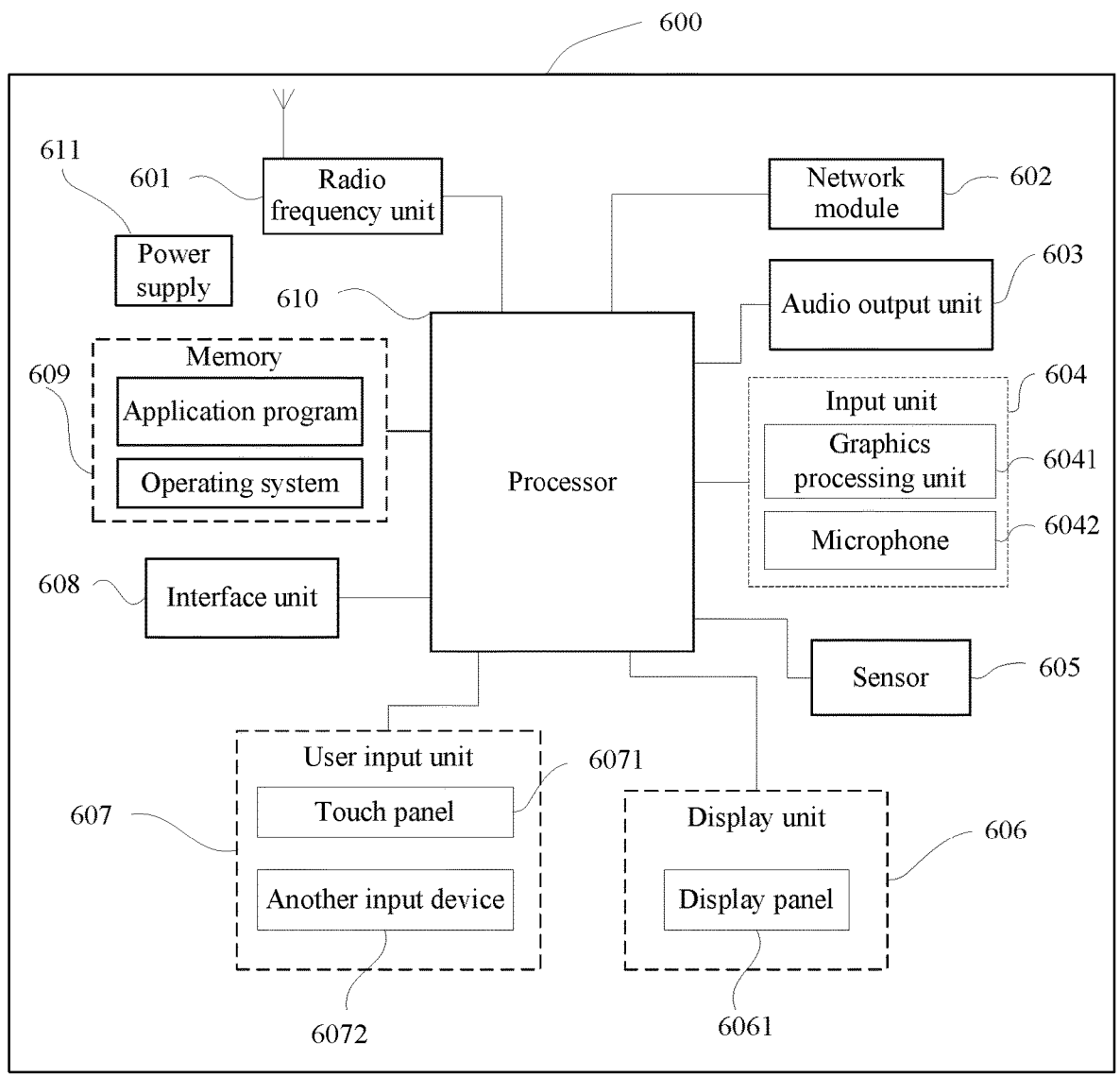
FIG. 6 is a structural diagram of another terminal according to an embodiment of the present disclosure.

Referring to FIG. 6, FIG. 6 is a schematic structural diagram of hardware of a terminal implementing embodiments of the present disclosure. The terminal 600 may include but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art can understand that the terminal 600 shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to:

receive a first system message broadcast by a network side device, where the first system message does not carry an access control parameter or carries at least one access control parameter, and each of the at least one access control parameter is associated with at least one piece of access information.

The processor 610 is configured to:

determine access information of the terminal, where the access information includes at least one of an access category and public land mobile network PLMN information; and perform a specific operation if the first system message does not carry the access control parameter or the access information is not associated with the at least one access control parameter.

Optionally, the processor 610 is further configured to:

perform the specific operation according to a preset rule, where the preset rule is used to instruct the terminal to allow initiation of an access request for the access information; or instruct the terminal to bar initiation of an access request for the access information; or instruct the terminal to apply an access control parameter agreed by a protocol to determine whether an access request for the access information is barred or not.

Optionally, the processor 610 is further configured to:

determine, based on a first access control parameter, whether an access request for the access information is barred or not, where the first access control parameter is not associated with the access information; or determine, based on a second access control parameter, whether an access request for the access information is barred or not, where the second access control parameter is associated with the access information.

Optionally, the first access control parameter is a control parameter specified in the at least one access control parameter; or a common access control parameter, where the common access control parameter is not associated with the access information.

Optionally, the common access control parameter is an access control parameter pre-configured in the terminal; or an access control parameter carried in the first system message; or an access control parameter carried in a second system message received by the terminal, where the second system message is different from the first system message.

Optionally, the second access control parameter is an access control parameter pre-configured in the terminal and associated with the access information.

In this embodiment of the present disclosure, access information of the terminal is determined, where the access information includes at least one of an access category and public land mobile network PLMN information; a first system message broadcast by a network side device is received, where the first system message does not carry an access control parameter or carries at least one access control parameter, and each of the at least one access control parameter is associated with at least one piece of access information; and a specific operation is performed if the first system message does not carry the access control parameter or the access information is not associated with the at least one access control parameter. In this way, when access information of a service request initiated by the terminal is not configured with an associated access control parameter, the terminal can perform the specific operation, thereby reducing a possibility that the operation of the terminal is uncontrollable, and improving service experience performance of the terminal.

It should be understood that, in this embodiment of the present disclosure, the radio frequency unit 601 can be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

UE provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a receiver, and the like.

The input unit 604 is configured to receive an audio signal or a video signal. The input unit 604 may include a graphics processing unit (GPU) 6041 and a microphone 6042. The graphics processing unit 6041 is configured to process image data of a static picture or a video obtained by an image capture apparatus (for example, a camera) in video capture mode or image capture mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 can receive sound and can process such sound into audio data. Processed audio data can be converted, in telephone call mode, into a format that can be sent to a mobile communication base station via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify UE postures (such as horizontal and vertical screen switch, related games, and magnetometer posture calibration), can perform functions related to vibration identification (such as a pedometer and a knock), and the like.

The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information input by the user or information provided to the user. The display unit 606 may include the display panel 6061, and the display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the UE. Specifically, the user input unit 607 includes a touch panel 6071 and another input device 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 can be implemented in various types such as resistive, capacitive, infrared, and surface acoustic wave. In addition to the touch panel 6071, the user input unit 607 may further include the another input device 6072. Specifically, the another input device 6072 may include but is not limited to a physical keyboard, function keys (such as a volume control key and a switch key), a trackball, a mouse, and a joystick. Details are not described herein.

Further, the touch panel 6071 can cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the UE, in some embodiments, the touch panel 6071 and the display panel 6061 can be integrated to implement the input and output functions of the UE. Details are not limited herein.

The interface unit 608 is an interface for connecting an external apparatus to the terminal 600. For example, the external apparatus may include a wired or wireless headphone port, an external power supply (or a battery charger) port, a wired or wireless data port, a storage card port, a port for connecting an apparatus having an identification module, an audio input/output (I/O) port, a video I/O port, a headphone port, or the like. The interface unit 608 can be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory or a nonvolatile memory, for example, at least one disk storage device, a flash memory, or another volatile solid-state storage device.

The processor 610 is a control center of the UE, connects various parts of the entire UE by using various interfaces and circuits, and performs various functions of the UE and processes data by running or executing software programs and/or modules stored in the memory 609 and invoking data stored in the memory 609, so as to monitor the UE as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It can be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules not shown. Details are not described herein.

Optionally, an embodiment of the present disclosure further provides a terminal 600, including a processor 610, a memory 609, and a program stored in the memory 609 and executable on the processor 610, where the program, when executed by the processor 610, implements the processes of the foregoing embodiments of the access control method, and the same technical effects can be achieved. To avoid repetition, details are not described herein again.

An embodiment of the present disclosure further provides a computer readable storage medium, where the computer readable storage medium stores a program, the program, when executed by the processor, implements the processes of the embodiment of the access control method for a terminal side provided in the embodiment of the present disclosure, or the program, when executed by the processor, implements the processes of the embodiment of the access control method for a network side device provided in the embodiment of the present disclosure, and the same technical effects can be achieved. To avoid repetition, details are not described herein again. The computer readable storage medium is, for example, a read-only memory (ROM), a random access memory (RAM), a magnetic disk, or an optical disk.

Figure 7:
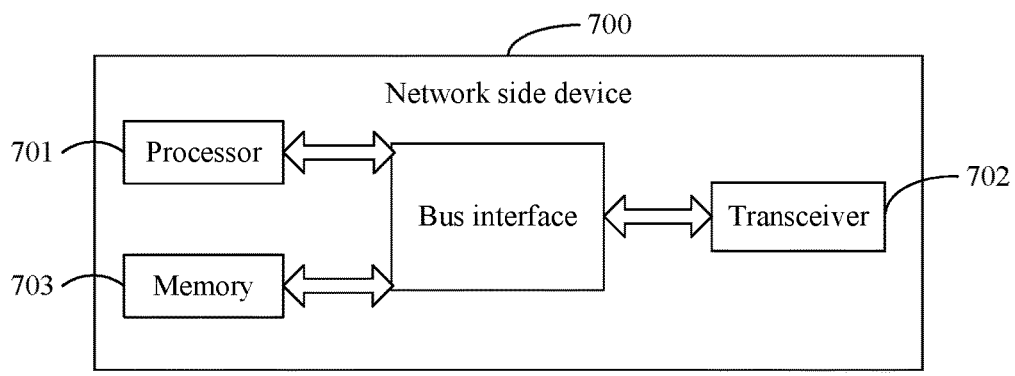
FIG. 7 is a structural diagram of another network side device according to an embodiment of the present disclosure.

Referring to FIG. 7, FIG. 7 is a structural diagram of another network side device according to an embodiment of the present disclosure. As shown in FIG. 7, the network side device 700 includes a processor 701, a transceiver 702, a memory 703, and a bus interface.

The transceiver 702 is configured to:
broadcast a first system message, where the first system message does not carry an access control parameter or carries at least one access control parameter, and carries a common access control parameter; or
broadcast a first system message and a second system message, where the first system message does not carry an access control parameter or carries at least one access control parameter, and the second system message carries a common access control parameter; or broadcast a second system message, where the second system message carries a common access control parameter, where each of the at least one access control parameter is associated with at least one piece of access information; and the common access control parameter is not associated with the access information.

The transceiver 702 is configured to receive and transmit data under control of the processor 701, and includes at least two antenna ports.

In FIG. 7, a bus architecture may include any quantity of interconnected buses and bridges, which are specifically connected together by one or more processors represented by the processor 701 and various circuits of a memory represented by the memory 703. The bus architecture may further connect together various other circuits of a peripheral device, a voltage stabilizer, a power management circuit, and the like, which are known in this art and will not be further described herein. The bus interface provides an interface. The transceiver 702 may include a plurality of elements, that is, include a transmitter and a receiver, and provide units for communication with various other apparatuses on a transmission medium. For different user equipment, the user interface 704 may alternatively be an interface for externally and internally connecting required equipment. The connected equipment includes but is not limited to a keypad, a display, a speaker, a microphone, a joystick, and the like.

The processor 701 is responsible for management of the bus architecture and general processing. The memory 703 may store data used by the processor 701 when operations are performed.

Optionally, an embodiment of the present disclosure further provides a network side device 700, including a processor 701, a memory 703, and a program stored in the memory 703 and executable on the processor 701, where the program, when executed by the processor 701, implements the processes of the foregoing embodiments of the message broadcasting method, and the same technical effects can be achieved. To avoid repetition, details are not described herein again.

An embodiment of the present disclosure further provides a computer readable storage medium, where the computer readable storage medium stores a program, the program, when executed by the processor, implements the processes of the embodiment of the message broadcasting method for a terminal side provided in the embodiment of the present disclosure, or the program, when executed by the processor, implements the processes of the embodiment of the message broadcasting method for a network side device provided in the embodiment of the present disclosure, and the same technical effects can be achieved. To avoid repetition, details are not described herein again. The computer readable storage medium is, for example, a read-only memory (ROM), a random access memory (RAM), a magnetic disk, or an optical disk.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is an optional embodiment. Based on such an understanding, the technical solutions of the present disclosure essentially, or the part contributing to the related art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. An access control method applied to a terminal, comprising:

determining first access information of the terminal, wherein the first access information comprises at least one of an access category and public land mobile network (PLMN) information;

receiving a first system message and/or a second system message broadcast by a network side device, wherein the first system message does not carry an access control parameter or carries at least one access control parameter, each of the at least one access control parameter is associated with at least one piece of second access information and is not associated with the first access information of the terminal, and the first system message or the second system message carries a common access control parameter that is not associated with the first access information of the terminal; and performing a specific operation in response to receiving the first system message and/or the second system message, when the first system message and/or the second system message does not carry an access control parameter, the performing a specific operation comprises:

performing the specific operation according to a preset rule, wherein the preset rule is used to instruct the terminal to allow initiation of an access request for the first access information; or instruct the terminal to bar initiation of an access request for the first access information; or instruct the terminal to apply an access control parameter agreed by a protocol to determine whether an access request for the first access information is barred or not, when the first system message and/or the second system message carries the at least one access control parameter, the performing a specific operation comprises:

determining, based on a first access control parameter, whether an access request for the first access information is barred or not, wherein the first access control parameter comprises the common access control parameter.

2. The method according to claim 1, wherein the first access control parameter also comprises the at least one access control parameter.

3. The method according to claim 2, wherein the common access control parameter is an access control parameter pre-configured in the terminal; or the common access control parameter is carried in the first system message; or the common access control parameter is carried in the second system message received by the terminal, wherein the second system message is different from the first system message.

4. A terminal, comprising: a memory, a processor, and a program stored in the memory and executable on the processor, wherein the program, when executed by the processor, causes the terminal to implement:
  determining first access information of the terminal, wherein the first access information comprises at least one of an access category and public land mobile network (PLMN) information;
  receiving a first system message and/or a second system message broadcast by a network side device, wherein the first system message does not carry an access control parameter or carries at least one access control parameter, each of the at least one access control parameter is associated with at least one piece of second access information and is not associated with the first access information of the terminal, and the first system message or the second system message carries a common access control parameter that is not associated with the first access information of the terminal; and
  performing a specific operation in response to receiving the first system message and/or the second system message,
  wherein when the first system message and/or the second system message does not carry an access control parameter, the performing a specific operation comprises:
  performing the specific operation according to a preset rule, wherein the preset rule is used to instruct the terminal to allow initiation of an access request for the first access information; or instruct the terminal to bar initiation of an access request for the first access information; or instruct the terminal to apply an access control parameter agreed by a protocol to determine whether an access request for the first access information is barred or not,
  when the first system message and/or the second system message carries the at least one access control parameter, the performing a specific operation comprises:
  determining, based on a first access control parameter, whether an access request for the first access information is barred or not, wherein the first access control parameter comprises the common access control parameter.

5. The terminal according to claim 4, wherein the first access control parameter also comprises the at least one access control parameter; or a common access control parameter.

6. The terminal according to claim 5, wherein the common access control parameter is an access control parameter pre-configured in the terminal; or the common access control parameter is carried in the first system message; or the common access control parameter is carried in a second system message received by the terminal, wherein the second system message is different from the first system message.

7. A non-transitory computer readable storage medium, wherein the non-transitory computer readable storage medium stores a program, and the program, when executed by a processor, implements the steps in the access control method according to claim 1.

* * * * *